C. DE LUKACSEVICS.
INTERNAL COMBUSTION ENGINE.
APPLICATION FILED MAY 3, 1919.

1,382,485.

Patented June 21, 1921.
6 SHEETS—SHEET 1.

C. DE LUKACSEVICS.
INTERNAL COMBUSTION ENGINE.
APPLICATION FILED MAY 3, 1919.

1,382,485.

Patented June 21, 1921.
6 SHEETS—SHEET 3.

Inventor
Charles de Lukacsevics

UNITED STATES PATENT OFFICE.

CHARLES DE LUKACSEVICS, OF NEW YORK, N. Y.

INTERNAL-COMBUSTION ENGINE.

1,382,485.   Specification of Letters Patent.   Patented June 21, 1921.

Application filed May 3, 1919. Serial No. 294,567.

*To all whom it may concern:*

Be it known that I, CHARLES DE LUKACSEVICS, a citizen of the United States, residing at New York, in the county of New York and State of New York, have invented new and useful Improvements in Internal-Combustion Engines, of which the following is a specification.

This invention relates to internal combustion engines, and more particularly to multiple cylinder, four-cycle engines of the type in which the reciprocating motion of the pistons is converted into rotary motion of the main or power shaft through a cam drum on the latter, thereby eliminating the usual cranks, connecting rods, wrist pins, etc., with their disadvantages, permitting high piston speed with low shaft velocity without the use of gears, and especially making it possible to drive the shaft at a speed corresponding to the cycle of the engine, so as to avoid the necessity of the usual auxiliary cam or timing shaft.

The invention has, among other objects, that of providing an improved engine of the type referred to of relatively simple, compact and light construction, whose parts may be easily and quickly assembled, disassembled and replaced; which is strong and durable, having few parts subject to wear and those readily accessible for purposes of repair; in which the forces are balanced or opposed in such a manner as to cushion each other and avoid eccentric strains upon the structure; and in which the destructive effect of the heat of combustion is reduced to a minimum.

Another object of the invention is to provide an improved combined inlet and exhaust valve mechanism of simple form in which the wear and power consumption are reduced to a minimum, which may be inexpensively constructed and assembled, which affords inlet and exhaust openings to the cylinders of maximum area or capacity so as to permit a quick intake and a rapid exhaust and thereby avoid the volumetric disadvantages of valves heretofore employed, which eliminates the necessity of inlet and exhaust manifolds, and in which the heat is utilized with maximum efficiency.

A further object of the invention is to provide an improved arrangement of bearings for the main or power shaft.

A still further object of the invention is to provide improved timing, cooling and lubricating devices for an engine of this general character.

The foregoing and other objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise practised without departing from the spirit or the scope thereof.

In said drawings:—

Figure 1:
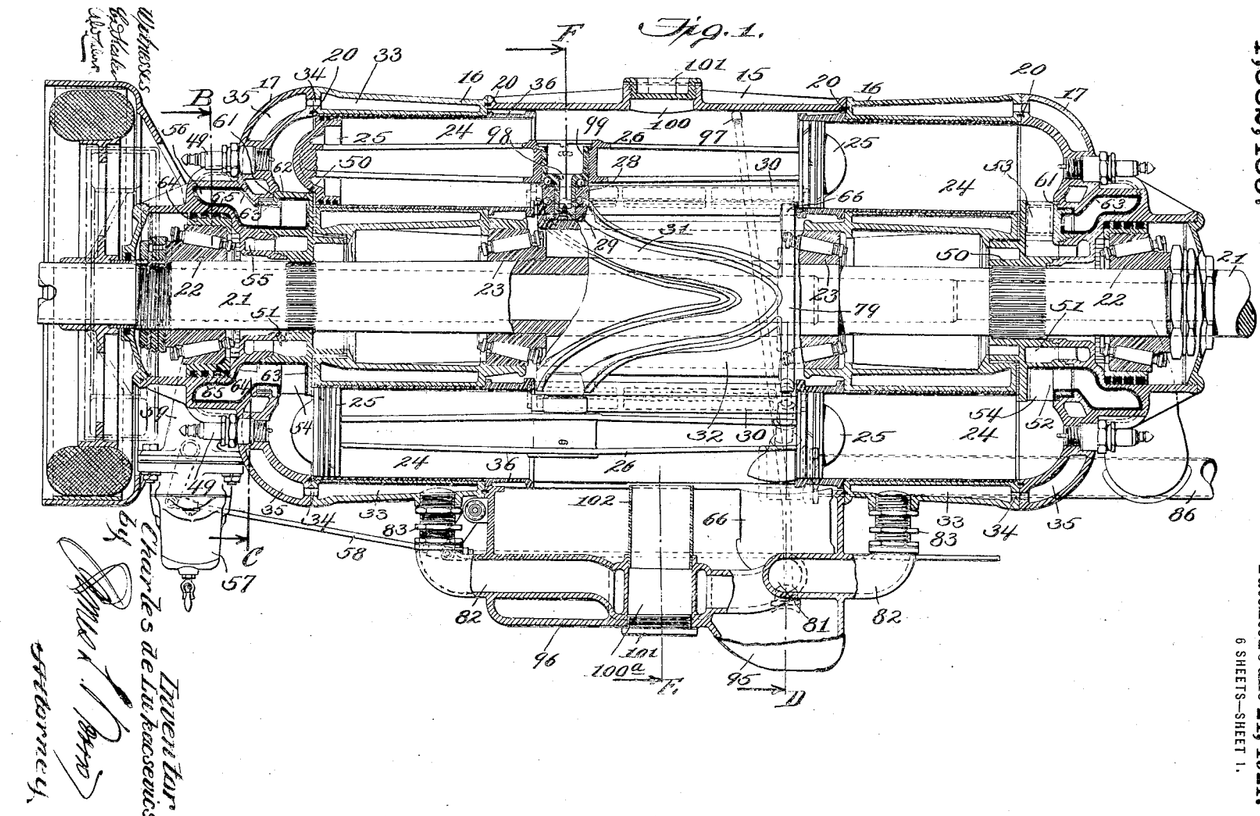
Figure 1 is a substantially central, vertical section of the complete engine.
Figure 6:
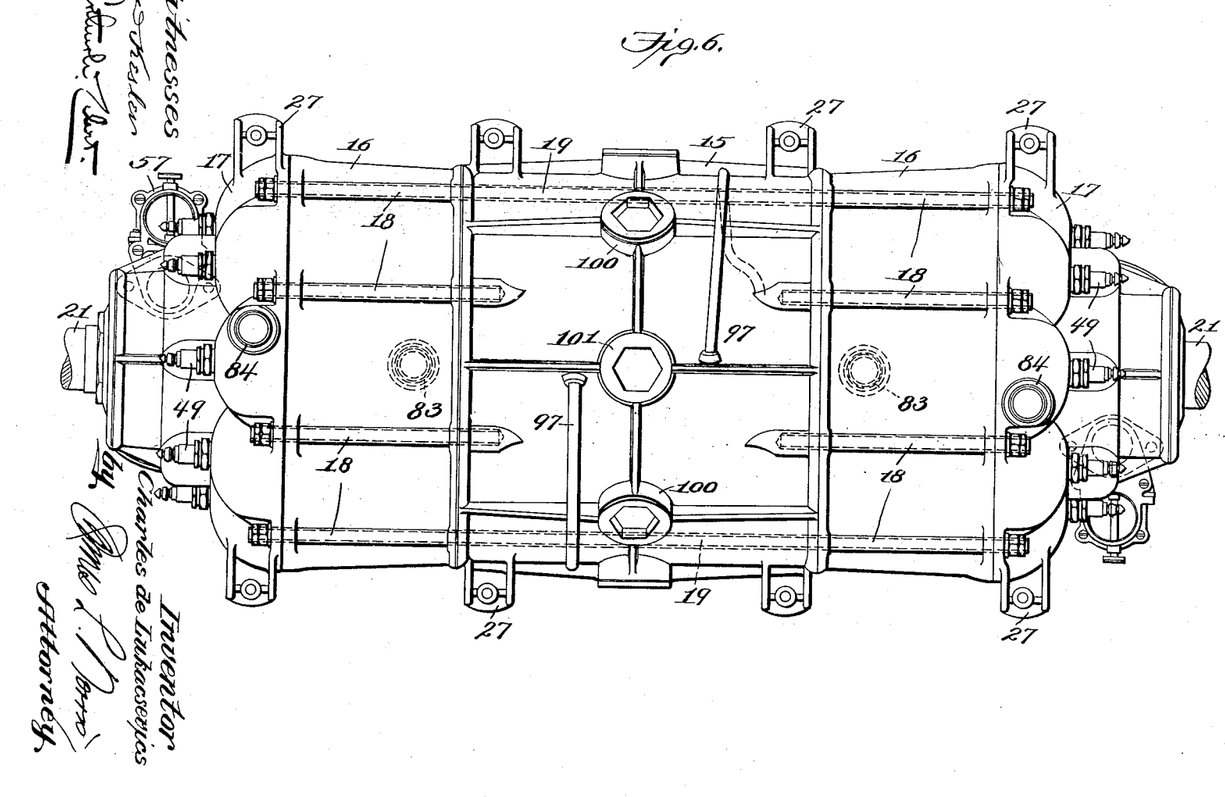
Fig. 6 is a top plan view of the complete engine.

Referring to Figs. 1 and 6, the engine structure as a whole is of sectional form and comprises five sections or units, namely; a center section or block 15, two similar cylinder sections 16 disposed at opposite sides of the center section or block, and two similar head sections or blocks 17 adjoining the cylinder sections at the outer ends of the latter. The sections or blocks 15, 16 and 17 are secured together by stud bolts 18 and through bolts 19, the latter (preferably four in number) passing through suitably disposed ears or bosses on all five sections, and the former being arranged in two sets, preferably of four each, each of said sets connecting one of the cylinder sections 16 and the corresponding head section 17 to the central section 15. Interposed between the adjacent ends of the several sections, and seated in annular grooves therein, are flat rings 20, said rings serving to aline and position the several sections relatively to one another and to assist the bolts 18 and 19 in retaining said sections in assembled relation. The several sections are of relatively simple construction and may be inexpensively machined, and the whole structure, when assembled, is of very compact arrangement. It will be observed that the several units are held together solely by the bolts 18 and 19, so that by removing said bolts the five sections may be readily separated, affording complete accessibility to any worn parts, and may be as readily re-assembled either with or without replacing any section which may have been damaged by a new section. The central section 15 and head sections 17 are preferably formed with suitable means, such as lugs 27, for supporting the structure or securing the same to a suitable base.

The main or power shaft 21, which extends through the axial center of the engine, is rotatably mounted in four roller bearings, namely, a pair of outer bearings 22 and a pair of inner bearings 23, said bearings being carried by the head sections 17 and cylinder sections 16 respectively, thereby affording a divided, extended, and extremely substantial bearing support for said shaft, not only securely retaining the same in proper alinement, but distributing the wear in such a manner as to reduce the same to a minimum.

Each of the cylinder sections 16 is formed with a plurality of horizontal cylinders 24 disposed with their axes parallel to the axis of the shaft 21 and evenly spaced in a circular series thereabout. The cylinders of each section 16 correspond exactly in form, size, number and arrangement to the cylinders of the other section, one cylinder of each section being disposed opposite and in axial alinement with a cylinder in the other section, so that the cylinders of the two sections are disposed in alined pairs. Each cylinder 24 is provided with a reciprocating piston 25 and the pistons of the cylinders of each pair are rigidly connected to form a unitary structure by a common piston rod 26 which may be, and preferably is, formed integral with said pistons. Each of the piston rods 26 carries intermediate its ends a pair of co-axial rollers 28 and 29. The rollers 28 are guide rollers and are guided between guide bars 30 disposed parallel to the piston rods 26 and extending across the central section 15 between the two cylinder sections 16. The rollers 29 are cam or power transmitting rollers and coöperate with a cam groove or path 31 formed on a cam drum 32 rigidly secured to the main shaft 21 within the central section 15 and between the bearings 23. The cam path or grooves 31 comprises four alternately oppositely inclined helical portions which collectively extend about the complete circumference of said drum.

From the foregoing, it will be seen that the reciprocating motion of the pistons 25 and piston rods 26 is transformed through the rollers 29 and cam grooves 31 into rotary motion of the shaft 21, and this without the use of the usual cranks and connecting rods. It will also been seen that, by properly designing the cam groove 31, the rate of rotation of the shaft 21 may be made to bear any desired relation to the velocity and length of stroke of the pistons, thereby providing for a high piston velocity with a low speed of the power shaft. Preferably, in the case of a four-cycle engine, and as herein shown, the arrangement is such that two complete reciprocations of each piston (that is, one complete cycle of the engine) is required in order to produce one complete rotation of the power shaft by making one revolution to four strokes of the piston. The power shaft will rotate in synchronism with the cycle of the engine instead of at an increased speed with respect thereto, as in the case of the usual four-cycle engine.

The cylinder blocks 16 are formed with annular spaces 33 surrounding the cylinders 24 and adapted to receive water or other circulated cooling fluid, said spaces communicating through ports 34 with similar spaces 35 in the head blocks, the latter spaces affording water jackets for the cylinder heads. The several blocks or sections 15, 16, 17 may, for the sake of lightness, be composed of aluminum, the cylinders 24 being provided with liners in the form of steel sleeves 36 exteriorly threaded to coöperate with interior threads formed in the cylinders. The ends of the guide bars 30 are seated in notches formed in the inner ends of the sleeves 36, whereby, when the bolts 18 and 19 are tightened, said guide bars are not only supported in position but serve to hold the sleeves against turning.

Figures 8, 9:
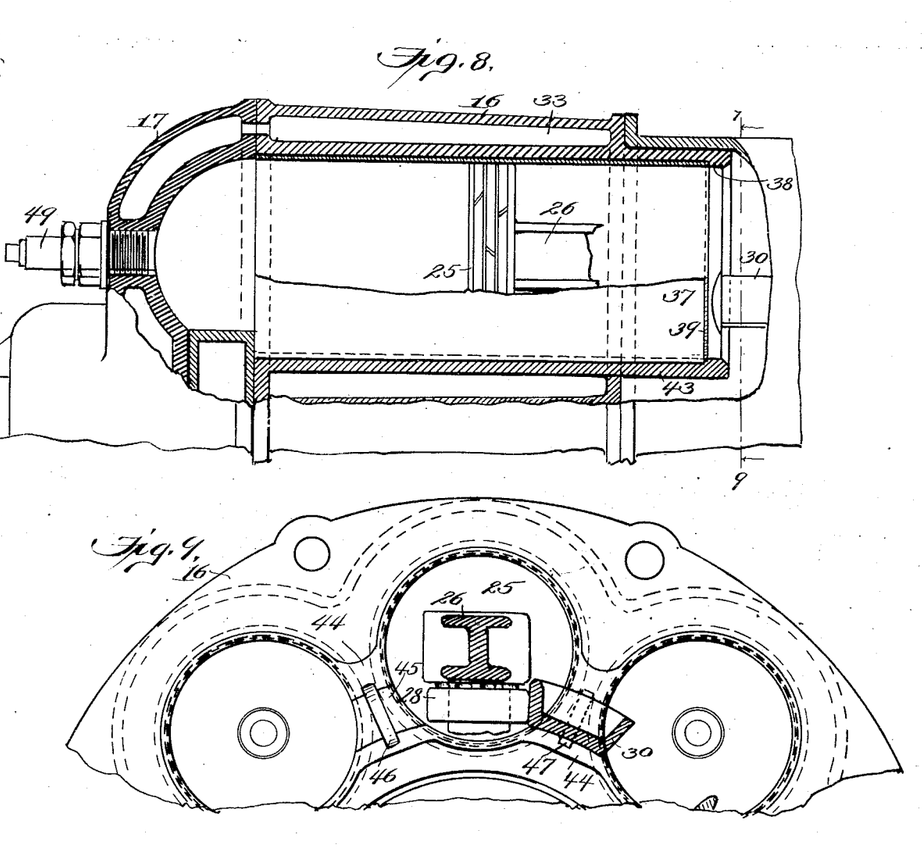
Fig. 8 is a longitudinal section of one of the cylinders, showing a slightly modified construction.
Fig. 9 is a section on the line 9—9, Fig. 8.

An alternative construction is shown in Figs. 8 and 9 wherein the liners or sleeves 37 are driven or pressed into the cylinders from the outer ends thereof, the inner ends of said sleeves being seated against interior flanges 38 formed at the inner ends of said cylinders. The inner ends of said sleeves 37 are preferably chamfered and knurled, as indicated at 39, so that, when said sleeves are forced into the cylinders, their knurled or roughened ends will be forced into the soft aluminum and prevent the sleeves from turning. The outer ends of the sleeves 37 are flush with the outer face of the cylinder block 16, so as to engage the inner face of the corresponding head block 17, which prevents said sleeves from becoming loose in their corresponding cylinders. In this construction, the inner ends of the cylinders 43 are connected by webs 44 formed with recesses 45 to receive the ends of the guide bars 30, said webs being further provided with slots 46 to receive keys 47 engaging the slotted ends of said guide bars to hold the latter against turning.

Figure 2:
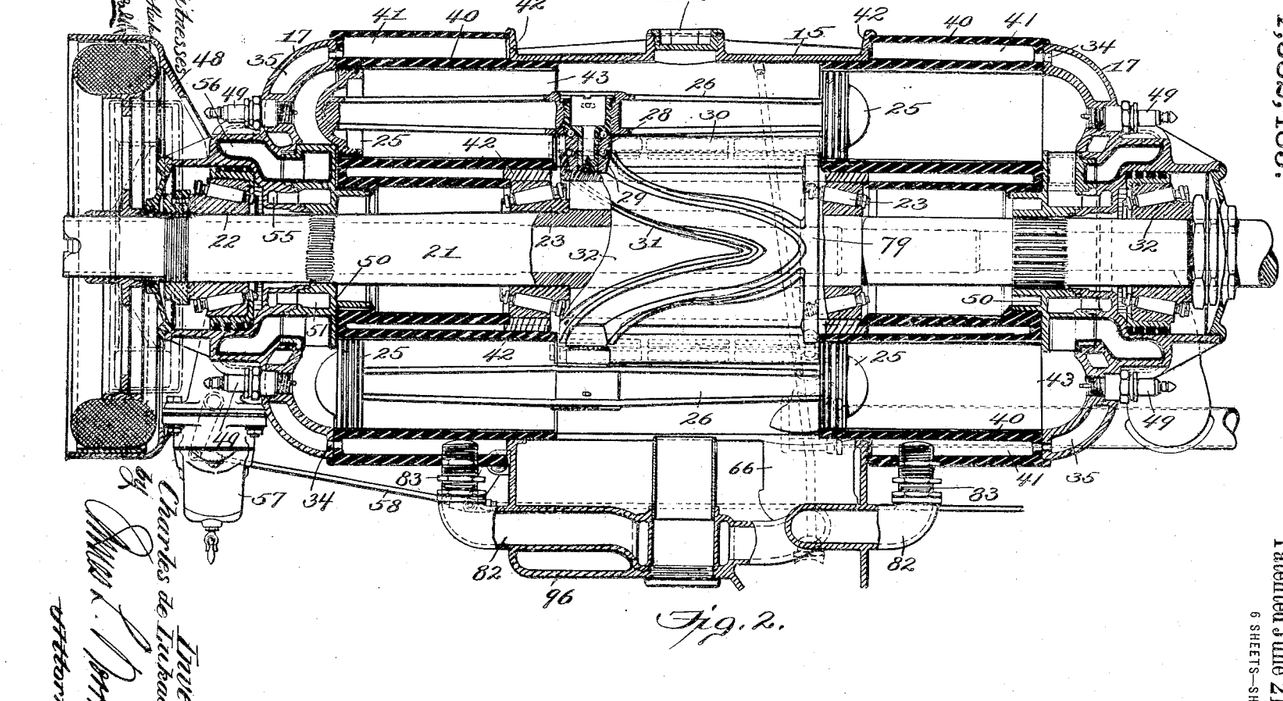
Fig. 2 is a similar view showing a slightly modified cylinder construction.

Still another cylinder construction is illustrated in Fig. 2 wherein the cylinder blocks 40 are formed with the water jackets 41 open at their inner ends and closed, when the parts of the engine are assembled, by flanges 42 formed on the ends of the center section or block 15. The cylinder blocks 40 are of such shape as readily to lend themselves to formation or production by the die process and may, therefore, conveniently be composed of plastic material or, preferably, of any one of that class of condensation products or compositions which are caused to solidify from a powder in any desired shape under the pressure of heated forming dies, variously known in the art as "bakelite," "condensite," etc. Certain of these substances have been found to possess marked and special advantages for use in internal combustion engines. When composed of such material, the cylinders are preferably provided with sleeves or liners 42 having suitably roughened exterior surfaces which are molded into the plastic material when the cylinder block is formed.

By reason of the fact that, as above explained, the operative connections between the pistons and the power shaft may be such as to cause said shaft to make one complete rotation for each complete cycle of the engine, the usual timing and cam shaft may be omitted and the timer and valve operated directly by the power shaft, said devices being preferably mounted directly on said shaft. Thus, in the construction shown in Figs. 1 and 2, there is shown an electrical device, designated as a whole by the numeral 48, which may comprise the usual timing disk or the like for controlling the circuit to the spark plugs 49.

The combined inlet and exhaust valves 50 are also supported by and rotated with the main shaft 21, said valves (of which there are two, one for each set of cylinders), being directly mounted on or secured to said shaft between the bearings 22 and 23 and being rotatably mounted in circular recesses or bores 61 in the head blocks 17. Said valves being supported entirely by said shaft, have no supporting bearings in the recesses 61, but only a working engagement with the walls thereof, so that the engaging parts of said valves and recesses are not subject to any considerable wear and require no special provision for lubrication.

The two valves 50 are substantially similar to one another and a description of one will suffice for both. Each of said valves is formed with an annular inlet chamber 51 and a concentric annular exhaust chamber 52 surrounding said inlet chamber. Said valve is formed on its periphery with an inlet port 53 communicating with the inlet chamber 51 and adapted, as the valve is rotated, to communicate successively with the several cylinders 24 of the corresponding set, as hereinafter further described. Said valve is also formed with a peripheral exhaust opening 54 communicating with the annular exhaust chamber 52 and also adapted to be brought into communication with the several cylinders of the set successively. The inlet and exhaust chambers 51 and 52 are open at the lateral face of the valve and communicate throughout their length with inlet and exhaust chambers 55 and 56, respectively, formed in the corresponding head block 17, the walls of the chambers of the valve having a working and substantially gas-tight fit with the walls of the chambers in said head block. Communicating with the inlet chamber 55 is an inlet passage 59 leading from the usual carbureter 57 and controlled by any suitable throttling devices 58, while the exhaust chamber 56 communicates with a suitable exhaust pipe 60. (See Fig. 7.)

Figure 7:
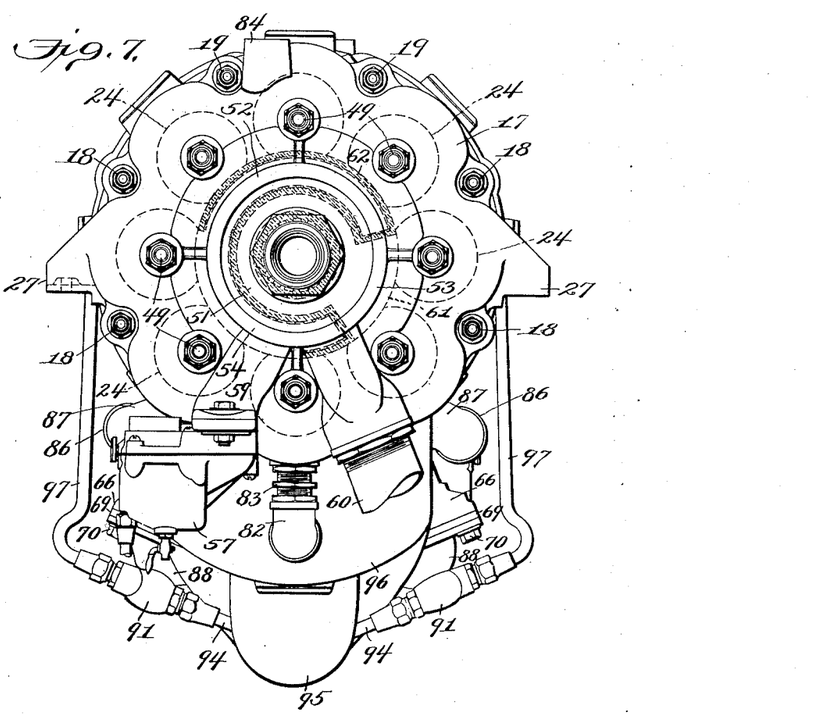
Fig. 7 is an end elevation, the cross-sectional form of the valve being indicated by shaded portions.

As indicated most clearly in Fig. 7, the recess 61 intersects the outer ends or combustion spaces of the cylinders 24, in the head block 17, and communicates therewith through a considerable length, so that the edge or periphery of the valve extends for a considerable distance into each of said combustion spaces or cylinders, thereby not only eliminating the necessity of accurately positioning the cylinder ports, but providing a large opening between the interior of each cylinder and the inlet or exhaust chamber in the head block, through said valve, when the latter is in the proper position. The valve inlet and exhaust ports 53 and 54 are of considerable area, while, as above stated, the valve inlet and exhaust chambers are in communication throughout their length with the inlet and exhaust chambers in the head block, so that, when either of said valve ports is in communication with a cylinder, a free and open passage to or from said cylinder is provided, whereby said cylinders may be rapidly charged or exhausted. It will be understood that the peripheral wall 62 of the valve 50, which also constitutes the outer wall of the exhaust chamber 52, serves to close the opening from the recess 61 to the several cylinders during the compression and explosion strokes of the pistons therein, It will thus be seen that, in the construction shown, a single valve is enabled to perform the function of both inlet and exhaust valves for a considerable number of cylinders. It will also be seen that since the inlet and exhaust chambers of this valve are in close proximity, the combustible gases entering the cylinder from the carbureter through the inlet chamber of the valve will be heated by the products of combustion in the exhaust chamber thereof, thereby efficiently utilizing the heat of combustion. It will furthermore be seen that, in the construction shown, no inlet or exhaust manifold is required.

The portions of the valve and engine casing which are subject to the heat of combustion, for example, the exhaust chamber 52 of the valve and the exhaust chamber 56 of the head block, are preferably lined with refractory material, preferably mica cement, to prevent over-heating, said cement lining being indicated by the heavy black lines 63 in Fig. 1. Also, in order to avoid over-heating of the bearings 22, which are supported by the head blocks 17, the retainers 64 of said bearings are preferably also provided with insulating blocks 65 of similar material, which blocks engage the wall of the head block 17.

The cooling and lubricating systems of the engine comprise a pair of combined water and oil pumps located, respectively, at opposite sides of the vertical center of the engine body or casing below the same. As these devices are exactly alike, a description of one will suffice for both.

Figures 3, 4, 5:
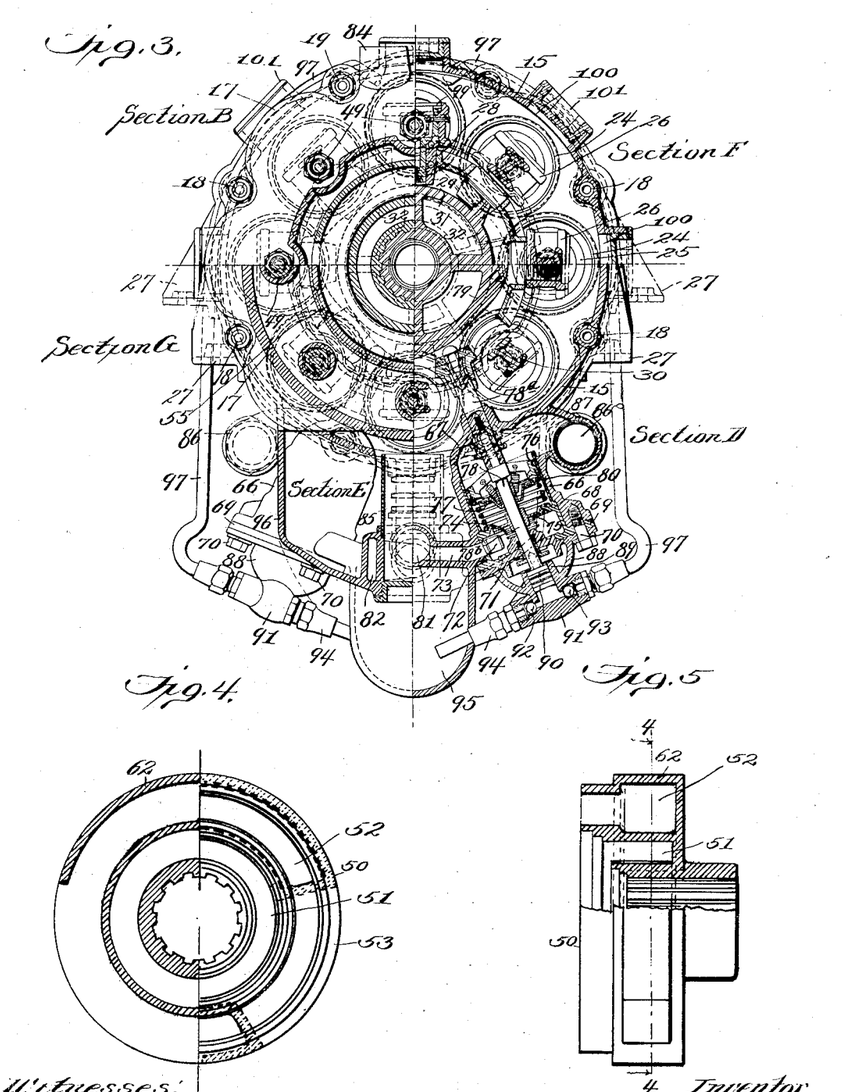
Fig. 3 is an irregular transverse vertical section, different portions thereof, as indicated thereon, being taken on the several planes B, C, D, E and F, Fig. 1, respectively.
Fig. 4 is an end elevation, partly in section on the line 4—4, Fig. 5, of one of the combined inlet and exhaust valves.
Fig. 5 is a side elevation, partly broken away, of said valve.
Figure 10:
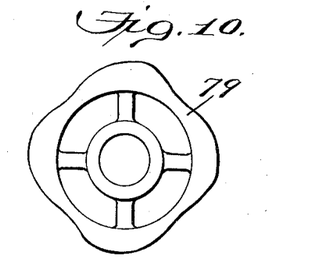
Fig. 10 is a detail view of the cam for operating the water and oil pumps.

Referring particularly to Fig. 3, the central casing section or block 15 is formed with a radially projecting cylindrical extension 66 having a closed inner end 67 and an open outer end in which is seated the cylinder proper 68 of the water pump, said cylinder having at its outer end a flange 69 secured to the outer end of the extension 66 by cap screws 70. The cylinder 68 has an open inner end communicating with the interior of the extension 66, while its outer end is closel by a cap or plug 71 in threaded engagement with the inner edge of the flange 69. Said cylinder is further provided with a lateral opening 72 in communication with an outlet conduit 73 (preferably formed integral with the extension 66) and, above said opening, with an interior flange 74 constituting a seat for an upwardly or inwardly closing, spring-pressed discharge valve 75. Mounted to reciprocate within the cylinder 68 is a piston 76 provided with an upwardly closing spring-pressed valve 77. The piston 76 is carried by a reciprocating rod guided for longitudinal movement in suitable bearings in the plug 71 and closed end or head 67 and in one of the guide bars 30. The inner end of the rod 78 coöperates with an edge cam 79 (see also Figs. 1 and 10) secured to or formed integral with the cam drum 32, said cam being preferably formed with four projections, whereby said rod is caused to make four complete reciprocations during each complete rotation of the main shaft 21. Said rod 78 is forced into engagement with the cam 79 by a compression spring 80 interposed between the piston 76 and the flange 74.

As will now be seen, reciprocation of the piston 76 in the cylinder 68 by the cam 79 and rod 78 will cause water or other cooling fluid to be drawn from the inner end of the extension 66 and forced through the outlet opening 72 into the discharge conduit 73. The discharge conduits 73 of the two pumps at opposite sides of the engine meet at a junction 81 (see also Fig. 7) from which lead two branches 82 connected by couplings 83 with the bottoms of the water spaces 33 of the two cylinder blocks or sections 16, whereby water from said branches is caused to circulate upwardly about the several cylinders of each section and also, through the passages 34 and water spaces 35 of the head blocks 17, about the cylinder heads. Adjacent the top of the engine the water spaces 35 of the head blocks are connected by couplings 84 (see Figs. 3, 6 and 7) with suitable pipes (not shown) leading to the radiator. From the radiator the water or other cooling fluid is returned to the inlet spaces or ends of the water pumps through pipes 86 communicating with branches 87 of the cylindrical extensions 66.

Secured to each of the cylinders 68 by the cap screws 70 is a cap or head 88 having a cylindrical portion 89 in axial alinement with the cylinder 68, said cylindrical portion 89 constituting the cylinder of the oil pump, and having therein a solid piston 90 secured to the outer end of the rod 78. The outer end of the cylinder 89 communicates with a valve housing 91 containing suitable inlet and discharge valves 92 and 93, respectively. The inlet valve 92 controls the inner end of a suction pipe or conduit 94 leading from a sump 95 constituting part of an oil reservoir 96 formed integral with the central casing section 95 at the bottom thereof. The discharge valve 93 controls a port communicating with a discharge pipe 97 leading to and communicating with the top of the center section 15. As will now be seen, oil drawn from the sump 95 will be forced through the pipes 97 to the top of the casing, where it will be discharged upon the mechanism, the motion of which will cause said oil to work its way into the various parts requiring lubrication, the oil eventually gravitating back to the reservoir 96 and sump 95.

The combined water and oil pumps may readily be disassembled for purposes of repair by disconnecting the pipes 94 and 97 from the valve casing 91, (suitable detachable couplings being provided for this purpose) removing the cap screws 70, and withdrawing the cylinder 68 and piston rod 78. For convenience in manufacture, said piston rod 78 is preferably formed in two inner and outer sections 78ª and 78ᵇ, respectively.

The discharge conduits 73 and branches 82 of the water circulating system preferably extend through the oil reservoir 96 (being, as herein shown, formed integral therewith) and are, therefore, submerged in the oil in said reservoir, thereby serving to cool said oil which, in turn, assists in reducing the temperature of the several working parts of the mechanism with which it is brought into contact.

From the foregoing description, it will be seen that, in case of any serious disorder in the engine, said engine may be quickly disassembled so as to render all parts thereof conveniently accessible merely by the removal of the bolts 18 and 19. The cam drum 32 and guide bars 30 are preferably composed of hardened steel, while the rollers 28 and 29 are preferably composed of bronze, so that said rollers are the only parts of the transmission mechanism which are subject to wear and may be readily replaced when worn. To facilitate the replacing of said rollers the following construction is preferably employed.

Referring particularly to Fig. 1, the rollers 28 and 29 are mounted, preferably by anti-friction bearings, on studs 98, each having an enlarged head 99 in threaded engagement with a central opening formed in the corresponding piston rod 26. The heads 99 and openings in the piston rods to receive the same are of slightly larger diameter than the rollers 28 and 29, whereby, by unscrewing said heads, the studs 98 and rollers carried thereby can be readily withdrawn outwardly through said openings without disturbing the relationship of the piston rods and cam drum. In order to permit this without disassembling the engine casing, the center block or section 15 is provided with a series of hand holes 100, located, respectively, opposite the several piston rods 26 and each closed by a screw cap or cover 101. The lowermost hand hole 100ª communicates with an upright tube 102 extending to the top of the oil reservoir 96 in order to prevent escape of the oil from said reservoir when the corresponding cover 101 is removed.

The firing order of the engine is preferably such that two cylinders, one in each set, are fired simultaneously, so that, since the forces so generated, as exerted upon the engine body, oppose and tend to cushion one another, the incidental strains are taken up entirely by the tie bolts 18 and 19. In the construction shown, a cylinder in one set is fired simultaneously with the second cylinder in advance in the circular series of the opposite set.

I claim:—

1. In an internal combustion engine, the combination with a body comprising a center block, a pair of cylinder blocks disposed respectively at opposite sides of said center block and each constituting a set of cylinders, and means for securing said blocks together, of pistons in said cylinders, said pistons having piston rods, a shaft journaled in said body, a drum on said shaft having a cam groove formed therein, means including rollers carried by said piston rods for operatively engaging said cam groove, and means including guide bars for guiding said rollers, said cylinder blocks having notches in which the ends of said guide bars are received and retained when said blocks are assembled.

2. In an internal combustion engine, in combination, a power shaft having a cam drum, a cylinder, a piston therein having a piston rod, and a cam roller carried by said piston rod and coöperating with said cam drum, said cam roller being removable without disturbing the relationship of said piston rod and drum.

3. In an internal combustion engine, in combination, a power shaft, a cam drum thereon, a plurality of cylinders parallel thereto and arranged in two circular sets thereabout, each cylinder of each set being in axial alinement with a cylinder of the opposite set, pistons in said cylinders, piston rods connecting the pistons of alined cylinders, and cam rollers carried by said piston rods intermediate their ends and coöperating with said cam drum, said rollers being removable when said drum and piston rods are in place.

4. In an internal combustion engine, in combination, a power shaft having a cam drum, a cylinder, a piston therein having a piston rod, and a cam roller carried by said piston rod and coöperating with said cam drum, said roller being removable from said drum through said piston rod.

5. In an internal combustion engine, in combination, a power shaft having a cam drum, a piston therein having a piston rod, a cam roller coöperating with said cam drum, said piston rod having an opening of greater diameter than said roller, and a stud by which said roller is carried, said stud having a head in threaded engagement with the opening in said piston rod.

6. In an internal combustion engine, in combination, a power shaft having a cam drum, a cylinder, a piston therein having a piston rod, a cam roller carried by said piston rod and coöperating with said cam drum, and a casing inclosing said drum and piston rod and having a hand hole opposite said piston rod through which said cam roller may be removed.

7. In an internal combustion engine, the combination with a body comprising a center block, a pair of cylinder blocks disposed respectively at opposite sides of said center block and each constituting a set of cylinders, a pair of head blocks disposed respectively at the outer sides of said cylinder blocks, and means for securing said blocks together; of a power shaft journaled in said body, a cam drum on said power shaft, pistons in said cylinders, piston rods connected to said pistons, and cam rollers carried by said piston rods and coöperating with said cam drum, said center block having a series of hand holes opposite said piston rods respectively through which said cam rollers may be removed.

8. In an internal combustion engine, the combination of a power shaft, a cam drum thereon, a plurality of cylinders parallel thereto and arranged in two circular sets thereabout, each cylinder of each set being in axial alinement with a cylinder of the opposite set, pistons in said cylinders, piston rods connecting the pistons of alined cylinders, cam rollers carried by said piston rods and coöperating with said cam drum, said rollers being removable when said drum and piston rods are in place, and a casing inclosing said drum and piston rods, said casing having a series of hand holes opposite said piston rods respectively through which said cam rollers may be removed.

9. In an internal combustion engine, in combination, two oppositely disposed sets of cylinders, liner sleeves in said cylinders having notched inner ends, pistons in said cylinders, said pistons having piston rods, a cam drum, means including rollers carried by said piston rods for operatively connecting said rods and drum, and means including guide bars seated at their ends in the notches in said sleeves for guiding said rollers.

10. In an internal combustion engine, the combination with a body comprising a center block, a pair of cylinder blocks disposed respectively at opposite sides of said center block and each constituting a set of cylinders, and means for securing said blocks together; of liner sleeves in said cylinders having notched inner ends, pistons in said cylinders, said pistons having piston rods, a shaft journaled in said body, a cam drum on said shaft, means including rollers carried by said piston rods for operatively connecting said rods and drum, and means including guide bars seated at their ends in the notches in said sleeves for guiding said rollers.

11. In an internal combustion engine, an engine shaft, a body comprising a center block and a pair of cylinder blocks oppositely disposed thereon having alining cylinders formed therein, liner sleeves in said cylinders, pistons adapted to reciprocate in said sleeves, a piston rod connecting said pistons having means mounted thereon for actuating said engine shaft, and rigid mechanism for restraining said means and said liner from rotation about the longitudinal axis of said cylinders and piston rod.

12. In an internal combustion engine, in combination, a center block, a pair of cylinder blocks disposed respectively at opposite sides of said center block and each constituting a circular series of parallel cylinders, a pair of head blocks disposed respectively at the outer sides of said cylinder blocks, each of said head blocks having combustion spaces communicating respectively with the cylinders of the adjacent cylinder block, and each of said head blocks having a circular valve chamber intersecting all of said combustion spaces, means for securing said blocks together, and a rotary valve in each of said valve chambers with its periphery extending into the adjacent combustion spaces.

13. In an internal combustion engine, the combination of a hollow cylindrical body composed of a phenol condensation product, a metallic cylinder head for said body, a metallic liner molded into said body, and a piston adapted to reciprocate in said liner.

14. In an internal combustion engine, a body comprising an aluminum center block, a pair of cylinder blocks composed of a phenol condensation product and disposed respectively at opposite sides of said center block, a pair of aluminum head blocks disposed respectively at the outer sides of said cylinder blocks, and means for securing said blocks together.

15. In an internal combustion engine, a cylinder composed of a phenol condensation product and having a hollow wall constituting a water jacket open at one end of the cylinder, a casing member having a flange adapted to close the open end of said cooling chamber, and means for securing said cylinder and casing member together.

16. In an internal combustion engine, the combination with a cylinder, a piston therein having a piston rod, a shaft, and a drum on said shaft having a cam with which said piston rod coöperates, of cooling fluid and lubricating pumps and a second cam on said drum for operating said pumps.

17. In an internal combustion engine, the combination with two or more oppositely disposed cylinders, pistons in said cylinders, piston rods connected with said pistons, a cam drum, means including rollers carried by said piston rods for operatively connecting said rods and drum, and means including guide bars interposed between opposite cylinders for guiding said rollers; of a pump having a piston rod guided in one of said guide bars, and a second cam on said drum for operating said pump piston rod.

18. In an internal combustion engine, the combination with a cylinder, a piston therein having a piston rod, a shaft, and a drum on said shaft having a cam with which said piston rod coöperates; of pumping mechanism comprising alined cooling fluid and lubricant pump cylinders, pump pistons therein, a common piston rod for said pump pistons, and a second cam on said drum with which said pump piston rod coöperates.

19. In an internal combustion engine, a body or casing having a cylinder, a lubricant reservoir arranged at the bottom thereof, a piston in said cylinder having a piston rod, a shaft journaled in said body or casing, a cam drum on said shaft coöperating with said piston rod, a lubricant pump and connections between said pump and reservoir and from said pump to the top of the casing whereby said pump may draw lubricant from said reservoir and discharge the same into the top of said body or casing upon said cam drum and piston rod.

20. In an internal combustion engine, in combination, a body or casing having a plurality of parallel cylinders arranged in two oppositely disposed sets, each of the cylinders of each of said sets being in axial alinement with a cylinder of the opposite set, and said body or casing having a lubricant reservoir at the bottom thereof, pistons in said cylinders, piston rods connecting the pistons of alined cylinders, a shaft journaled in said body or casing, a cam drum on said shaft coöperating with said piston rods, a lubricant pump operated by said cam drum, and connections between said pump and reservoir and from said pump at the top of the casing whereby said pump may draw lubricant from said reservoir and discharge the same into the top of said body or casing upon said cam drum and piston rods.

21. In an internal combustion engine, the combination with a body or casing having a cylinder, a lubricant reservoir arranged at the bottom thereof, a piston in said cylinder having a piston rod, a shaft journaled in said body or casing, and a drum on said shaft having a cam with which said piston rod coöperates; of a lubricant pump and connections to the pump for drawing lubricant from said reservoir and discharging the same into the top of said body or casing upon said drum and piston rod, and a second cam on said drum for operating said pump.

22. In an internal combustion engine, oppositely disposed cylinder blocks having detachable heads, engine shaft bearings supported by said heads and exhaust chambers in said head lined with refractory material to prevent overheating of said bearings.

In testimony whereof I have hereunto set my hand in presence of two subscribing witnesses.

CHARLES DE LUKACSEVICS.

Witnesses:
F. H. KNAPP,
G. KATHMAN.